United States Patent
Lee et al.

(10) Patent No.: US 6,476,174 B1
(45) Date of Patent: Nov. 5, 2002

(54) PROCESS FOR PREPARING A SILICA-BASED ORGANIC-INORGANIC HYBRID RESIN AND THE ORGANIC-INORGANIC HYBRID RESIN PREPARED THEREFROM

(75) Inventors: Ming-Shi Lee, Hsinchu; Chin-I Lin, Tainan Hsien; Chao-Kang Chang, Taoyuan Hsien; Ching-Jiuh Kang; Kuei-Lan Peng, both of Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/880,771

(22) Filed: Jun. 15, 2001

(51) Int. Cl.[7] .................. C08G 77/06; C08G 77/42
(52) U.S. Cl. .................. 528/29; 525/476; 525/487; 528/20
(58) Field of Search .................. 525/476, 487; 528/20, 29

(56) References Cited

U.S. PATENT DOCUMENTS

| | | | | |
|---|---|---|---|---|
| 4,411,964 A | * | 10/1983 | Hara et al. .................. | 428/623 |
| 4,742,111 A | * | 5/1988 | Chi .................. | 524/596 |
| 4,889,876 A | * | 12/1989 | Yamamoto .................. | 501/88 |
| 5,019,607 A | * | 5/1991 | Coltrain et al. .................. | 523/435 |
| 5,231,156 A | * | 7/1993 | Lin .................. | 526/240 |
| 5,280,054 A | * | 1/1994 | Sakai et al. .................. | 523/500 |
| 5,534,748 A | * | 7/1996 | Oomen .................. | 252/582 |
| 5,776,565 A | * | 7/1998 | Volpe et al. .................. | 428/34.2 |
| 6,103,854 A | * | 8/2000 | Arakawa et al. .................. | 528/196 |

FOREIGN PATENT DOCUMENTS

JP      11092623 A2 * 4/1999

* cited by examiner

*Primary Examiner*—Robert Dawson
*Assistant Examiner*—Marc S Zimmer
(74) *Attorney, Agent, or Firm*—Sughrue Mion, PLLC

(57) ABSTRACT

A process for preparing silica-based organic-inorganic hybrid resin using sol-gel process. Phenol is used as catalyst to reduce the gel time of the sol-gel process and cyclosiloxane is used as modifier to increase the toughness of the resultant inorganic-organic hybrid resin.

24 Claims, 1 Drawing Sheet

PROCESS FOR PREPARING A SILICA-BASED ORGANIC-INORGANIC HYBRID RESIN AND THE ORGANIC-INORGANIC HYBRID RESIN PREPARED THEREFROM

BACKGROUND OF THE INVENTION

1. Field of the Invention

The present invention relates in general to a process for preparing a silica-based organic-inorganic hybrid resin and the hybrid resin prepared therefrom. In particular, the invention relates to a process for preparing a silica-novolac hybrid resin using sol-gel process in which phenol is used as catalyst and octamethycyclotetrasiloxane is used as modifier.

2. Description of the Related Art

Organic-inorganic hybrid resins from sol-gel process of silica-novloac have been developed recently. This kind of hybrid resins has applications in flame-retardants, thermal insulation, chromatographic packing, water filtration, ion exchange and carbon electrodes for energy storage devices. The hybrid resins are prepared by subjecting organic polymer or oligomer and alkoxides to hydrolysis-condensation reaction. The organic polymer not only can be homogeneously dispersed in the inorganic network formed but also be covalently bonded thereto. And thus the mechanical properties such as failure modulus, Yang modulus of the hybrid resins are superior due to the covalently cross-linked structure.

However, in the sol-gel process of organic carbon aerogels, acid catalysts are used. For example, U.S. Pat. No. 5,744,510 discloses a process for fabricating aerogels. The process includes reacting phenolic-novolac oligomer with furfural in the presence of toluene sulfonic acid or phosphoric acid to produce cross-linked gel. The cross-linked gel is then super-critically dried to form high surface area aerogels. Using acids as catalyst will inevitably cause ion contamination to the environment. Also, in case the amount of the formed silica clusters increases, phase separation between the organic phase and inorganic phase is easily formed. This often results in the deterioration of the physical properties, such as strength and toughness of the final product.

SUMMARY OF THE INVENTION

An object of the present invention is to provide a process for preparing inorganic-organic hybrid resin, by which process, no phase separation occurs, the gel time of the sol-gel process is reduced, and there is no need to use acids as catalysts.

Another object of the invention is to provide an inorganic-organic hybrid resin that exhibits superior physical properties.

It has been found that in the presence of phenol or phenolic resin as catalyst, the gel time of the sol-gel process of silane can be reduced and the formed silica clusters have a lower surface hardness.

Accordingly, a process of preparing a silica-based inorganic-organic hybrid resin of the invention includes hydrolyzing silane in the presence of a phenol or phenolic resin, condensing the hydrolyzed silane to obtain silica clusters, and reacting the silica clusters with thermosetting resins.

The phenol or phenolic resin has hydroxy group, and thus can facilitate the sol-gel process, which uses water as a main medium, resulting in the reduction of the gel time. Also, hydroxy groups react with the Si—OH and Si—OEt and form Si—O—C bonds resulting in the lowering of the surface hardness of the silica clusters. Phenol or phenolic rein is actually a weak acid and thus can be used as catalyst and does not cause any ion contamination.

It has also be found that modifying the silica clusters with cyclosiloxane before they react with organic resin such as phenolic-novolac resin, can increase the toughness of the resultant inorganic-organic hybrid resin and also facilitate the sol-gel process so as to enlarge the reaction window.

Based on this finding, an improved process of the invention includes hydrolyzing silane in the presence of a phenol or phenolic resin, condensing the hydrolyzed silane to obtain silica clusters, reacting the silica cluster with cyclosiloxane, and reacting the modified silica clusters with thermosetting resins.

BRIEF DESCRIPTION OF THE DRAWINGS

The present invention can be more fully understood by reading the subsequent detailed description in conjunction with the examples and references made to the accompanying drawing, wherein.

DETAILED DESCRIPTION OF THE INVENTION

Figure 1:
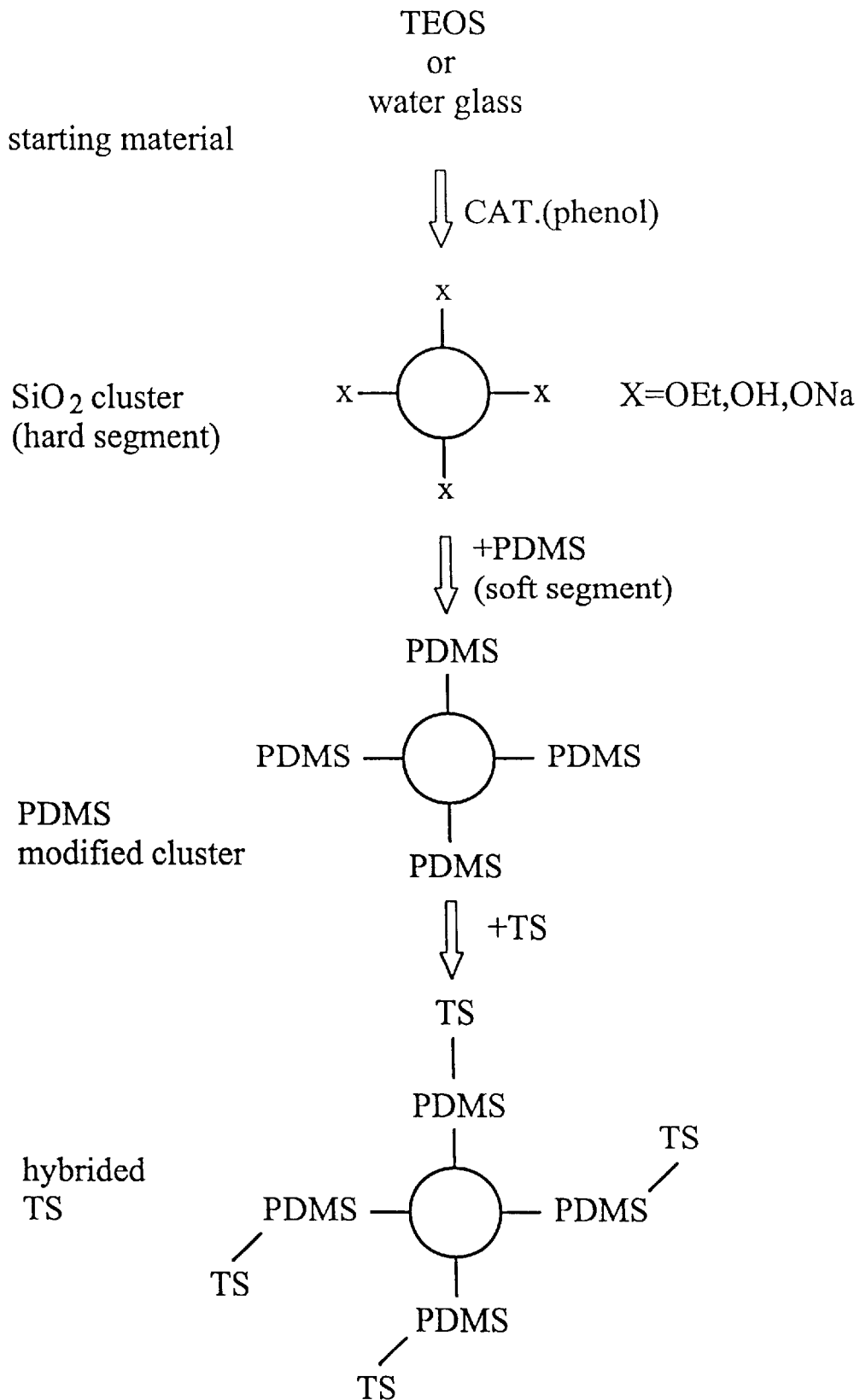
FIG. 1 is a schematic diagram showing an embodiment of the process of forming inorganic-organic hybrid resin according to the present invention.

Referring to FIG. 1, starting materials, such as tetraethylorthosilicate (TEOS) or water glass is first hydrolyzed followed by condensation in the presence of phenol as catalyst to form silica clusters. Each core of the formed clusters has a plurality of extended functional groups such as OEt, OH and ONa. The silica clusters are hard segments. In order to impart the silica clusters with soft segments, the functional groups of the clusters are then reacted with PDMS (poly(dimethyl silxane)) to form modified clusters. The modified clusters are then reacted with thermosetting resins (TS resins), to obtain hybrid resins. The so formed hybrid resins, as have both hard segments (silica clusters) and soft segments (PDMS segments), have more flexibility in their application.

Not that the above schematic diagram only shows an embodiment of the process of the invention. For example, suitable starting materials are not limited to tetraethoxysilane (TEOS), water glass and silicic acids but include silane having a formula of $R^1{}_n Si(OR^2)_{4-n}$ wherein n is an integer of 0, 1, 2 or 3, $R^1$ is a terminal group selected from the group consisting of alkyl, epoxy, alkenyl, amino, carboxyl, and hydroxy, as well as an alkyl having the above-mentioned terminal group, $R^2$ is an $C_1$–$C_4$ alkyl.

In the sol-gel process to form the silica clusters, the silane is subjected to hydrolysis and condensation reaction. The reaction scheme is depicted as reaction scheme I as shown below.

(REACTION SCHEME I)

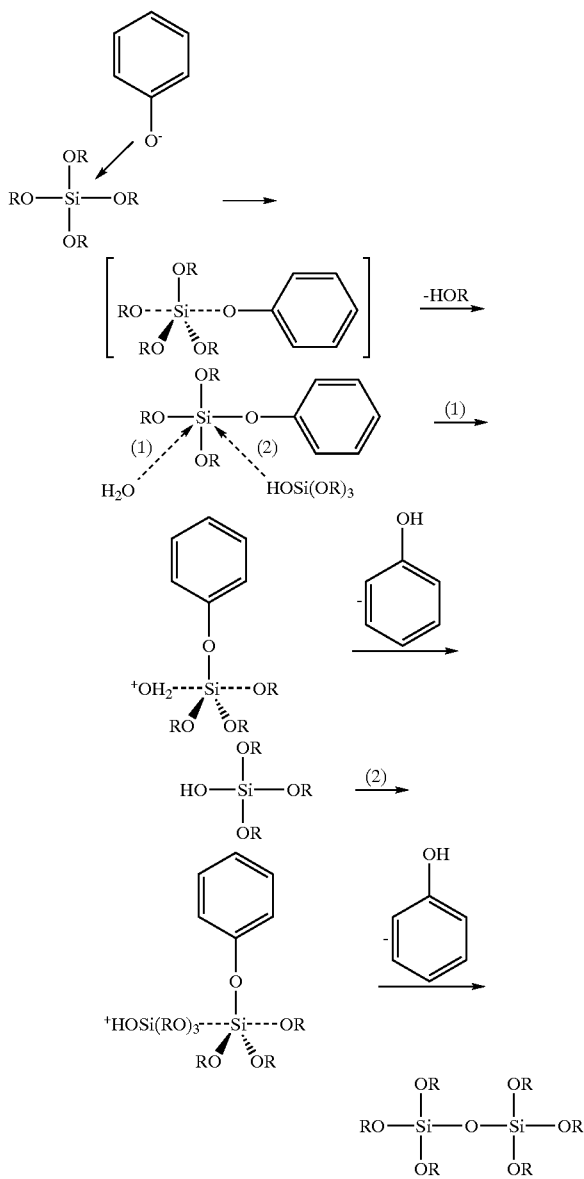

As can be understood from the above reaction scheme, the —OH group of the catalyst, phenol, functions as an acid and a reacting site, and thus facilitating the hydrolysis and the condensation reactions. In other words, in hydrolysis reaction, phenol functions as a weak acid catalyst while in the condensation reaction it functions as a weak base catalyst. Preferably, phenol is used as the catalyst. Phenolic resin such as novolac resin is also suitable for use as catalyst. When a phenolic resin is used as the catalyst, its molecular weight is preferably smaller than 30,000, most preferably is smaller than 5000. The amount of the phenolic resin used in the invention is preferably 50 to 100 parts by weight based on 100 parts by weight of the starting material.

The sol gel process is conducted in a liquid organic solvent. Preferably the organic solvent is a polar organic solvent. Examples of the organic solvent include but are not limited to ester, ketone, ether, alcohol, aliphatic solvent and aromatic solvent. The amount of the solvent used should be 10–30 parts by weight based on 100 parts by weight of the starting material.

Optionally, in the sol-gel process of the invention, water can also be added. If water is to be added, the amount of the water is 5–20 parts by weight based on 100 parts by weight of the starting materials, i.e., silane such as TEOS, water glass or silicic acids.

In addition to phenol, acids such as HCl or bases such as sodium fluoride (NaF) can also be added. Adding acid facilitates the hydrolysis, reduces the gel time, does not influence the structure of the formed gel, and does not change the grain size of the silica clusters much. However, the addition of acids will cause the contamination of the environment and thus the amount of the acids added should be as less as possible. Adding sodium fluoride can not only accelerate the hydrolysis rate but also accelerate the condensation rate, and thus the gel time can be reduced significantly. However, as the addition of sodium fluoride can change the condensation rate significantly, the formed silica clusters have larger size. It is preferably, if sodium fluoride is used the amount should be limited to less than 2.5 parts by weight based on 100 parts by weight of the starting material.

The siloxane suitable for use in the process of the invention is preferably a cyclosiloxane having formula of $(R_2^3SiO)_m$ wherein $R^3$ is an alkyl and m is an integer equal or greater than 3. The most preferred cyclosiloxane is octamethycyclotetrasiloxane (D4). D4 is a cyclotetramer having the following structure:

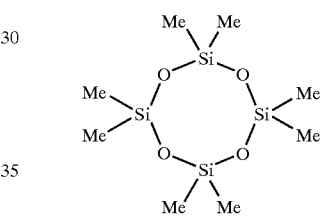

The ring of the D4 structure opens in acidic ambient, forming short chain polydimethylsilicone (PDMS) segments. Moreover, as D4 also is a symmetric tetramer, the nucleophilic substitution reaction for D4 is fast, because the nucleophile can attack any of the four Si centers. The PDMS segments formed after the ring-open reaction function as side-chain extenders, which control the size of the silica clusters formed thereafter and also increase the toughness of the final product. The amount of the siloxane is 0–200 parts by weight, preferably 10–60 parts by weight based on 100 parts by weight of the starting material.

The thermosetting resins suitable for use in the present invention are those having at least one hydroxy group in their structure. Examples of the thermosetting resins include but are not limited to phenolic-novolac resin, epoxy resin, and phenolic resin. The amount of the thermosetting resins is 10–200 parts by weight, preferably 20–60 parts by weight based on 100 parts by weight of the starting material.

The present invention is more specifically described by the following non-limiting examples.

Preparative Example 1

5 N phenol solution was prepared by using mixed solution of hexanol and water (1/1 volume ratio). 4 parts by weight of TEOS, 2 parts by weight of D4, 4 parts by weight of 5N phenol solution, 2 parts by weight of ethanol and 1 parts by weight of water were mixed and agitated at a temperature of 60° C. for 1 hour. The mixture became gel after 2 hours and silica cluster formed.

Preparative Example 2

5 N phenol solution was prepared by using mixed solution of hexanol and water (1/1 volume ratio). 4 parts by weight of TEOS, 4 parts by weight of D4, 2 parts by weight of 5N phenol solution, 2 parts by weight of ethanol and 1 parts by weight of water were mixed and agitated at a temperature of 60° C. for 1 hour. The mixture became gel after 3 hours and silica cluster formed.

Preparative Example 3

5 N phenol solution was prepared by using mixed solution of methanol and water (50/50 weight ratio). 4 parts by weight of TEOS, and 4 parts by weight of 5N phenol solution were mixed and agitated at a temperature of 60° C for 1 hour. The mixture became gel 5 days later and silica cluster formed.

Preparative Example 4

5 N phenol solution was prepared by using mixed solution of methanol and water (50/50 weight ratio). 4 parts by weight of TEOS and 2 parts by-weight of 5N phenol solution were mixed and agitated at a temperature of 60° C. for 1 hour. The mixture became gel 6 days later and silica clusters formed.

Preparative Example 5

5 N phenol solution was prepared by using mixed solution of methanol and water (50/50 weight ratio). 4 parts by weight of TEOS, 2 parts by weight of 5N phenol solution, and 0.5 parts by weight of 1N HCl were mixed and agitated at a temperature of 60° C. for 1 hour. The mixture became gel 3 days later and silica cluster formed.

Preparative Example 6

5 N phenol solution was prepared by using mixed solution of methanol and water (50/50 weight ratio). 4 parts by weight of TEOS, 4 parts by weight of 5N phenol solution, and 0.1 parts by weight of 1N NaF were mixed and agitated at a temperature of 60° C. for 1 hour. The mixture became gel 5 hours later and silica clusters formed.

Preparative Example 7

5 N phenol solution was prepared by using mixed solution of methanol and water (50/50 weight ratio). 4 parts by weight of TEOS, 2 parts by weight of 5N phenol solution, and 0.1 parts by weight of 1N NaF were mixed and agitated at a temperature of 60° C. for 1 hour. The mixture became gel 2 hours later and silica cluster formed.

Preparative Example 8

5 N phenol solution was prepared by using mixed solution of methanol and water (1/1 volume ratio). 4 parts by weight of TEOS, 2 parts by weight of 5N phenol solution, 0.5 parts by weight of HCl solution, and 0.1 parts by weight of 1N NaF were mixed and agitated at a temperature of 60° C. for 1 hour. The mixture became gel 1 hour later and silica cluster formed.

Preparative Example 9

5 N phenol solution was prepared by using mixed solution of methanol and water (50/50 volume ratio). 4 parts by weight of water glass and 4 parts by weight of 5N phenol solution were mixed and agitated at a temperature of 60° C. for 1 hour. The mixture became gel 3 hours later and silica cluster formed.

Preparative Example 10

5 N phenol solution was prepared by using mixed solution of methanol and water (50/50 weight ratio). 4 parts by weight of water glass and 2 parts by weight of 5N phenol solution were mixed and agitated at a temperature of 60° C. for 1 hour. The mixture became gel 3 hours later and silica cluster formed.

Preparative Example 11

5 N phenol solution was prepared by using mixed solution of methanol and water (50/50 weight ratio). 4 parts by weight of water glass, 2 parts by weight of 5N phenol solution and 0.5 parts by weight of 1N HCl were mixed and agitated at a temperature of 60° C. for 1 hour. The mixture became gel 2 hours later and silica cluster formed.

Preparative Example 12

5 N phenol solution was prepared by using mixed solution of methanol and water (50/50 volume ratio). 4 parts by weight of water glass, 4 parts by weight of 5N phenol solution and 2 parts by weight of water were mixed and agitated at a temperature of 60° C. for 1 hour. The mixture became gel 4 hours later and silica cluster formed.

Preparative Example 13

5 N phenol solution was prepared by using mixed solution of hexanol and water (1/1 volume ratio). 4 parts by weight of water glass, 2 parts by weight of 5N phenol solution and 2 parts by weight of water were mixed and agitated at a temperature of 60° C. for 1 hour. The mixture became gel 4 hours later and silica cluster formed.

Preparative Example 14

5 N phenol solution was prepared by using mixed solution of hexanol and water (1/1 volume ratio). 4 parts by weight of water glass, 2 parts by weight of 5N phenol solution, 2 parts by weight of water, and 0.5 parts by weight of 1N HCl were mixed and agitated at a temperature of 60° C. for 1 hour. The mixture became gel 3 hours later and silica cluster formed.

EXAMPLE 1

5 N phenol solution was prepared by using mixed solution of methanol and water (50/50 weight ratio). 40 parts by weight of TEOS, 20 parts by weight of 5N phenol solution, 20 parts by weight of D4, 5 parts by weight of 1N HCl, and 0.8 parts by weight of surfactant were mixed and agitated at a temperature of 60° C. for 1 hour. The mixture became gel 3 hours later and silica clusters formed.

43 parts of weight of phenolic resin was then added to the formed gels and agitated for 30 minutes. 2.5 parts by weight of curing agent (10% PTSA in phosphoric acid) was added, and poured into a plate mold. The mold was then evacuated in vacuum and placed in an oven of 60° C. to obtain specimens. The $T_g$ and stress-strain of these specimens were tested. The $SiO_2$ content is 31%, the $T_g$ of the formed hybrid resin is 199° C., and the stress-strain is 0.850.

EXAMPLE 2

5 N phenol solution was prepared by using mixed solution of methanol and water (50/50 weight ratio). 40 parts by weight of TEOS, 20 parts by weight of 5N phenol solution, 20 parts by weight of D4, 5 parts by weight of 1N HCl, and 0.8 parts by weight of surfactant were mixed and agitated at a temperature of 60° C. for 1 hour. The mixture became gel 3 hours later and silica clusters formed.

86 parts of weight of phenolic resin was then added to the formed gels and agitated for 30 minutes. 5 parts by weight of curing agent (10% PTSA in phosphoric acid) was added, and poured into a plate mold. The mold was then evacuated in vacuum and placed in an oven of 60° C. to obtain specimens. The $T_g$ and stress-strain of these specimens were tested. The $SiO_2$ content is 22%, the $T_g$ of the formed hybrid resin is 194° C., and the stress-strain is 0.832.

EXAMPLE 3

5 N phenol solution was prepared by using mixed solution of methanol and water (50/50 weight ratio). 40 parts by weight of TEOS, 20 parts by weight of 5Nphenol solution, 20 parts by weight of D4, 5 parts by weight of 1N HCl, and 0.8 parts by weight of surfactant were mixed and agitated at a temperature of 60° C. for 1 hour. The mixture became gel 3 hours later and silica clusters formed.

172 parts of weight of phenolic resin was then added to the formed gels and agitated for 30 minutes. 10 parts by weight of curing agent (10% PTSA in phosphoric acid) was added, and poured into a plate mold. The mold was then evacuated in vacuum and placed in an oven of 60° C. to obtain specimens. The $T_g$ and stress-strain of these specimens were tested. The $SiO_2$ content is 11%, the $T_g$ of the formed hybrid resin is 189° C., and the stress-strain is 0.588.

EXAMPLE 4

40 parts by weight of TEOS, 5 parts by weight of novolac resin, 4 parts by weight-of water, 7 parts by weight of D4, 0.125 parts by weight of B8404 (surfactant), and 20 parts by weight of isopropanol (IPA) were mixed and agitated at a temperature of 50° C. for 1 hour. The mixture became gel 2 hours later and silica cluster formed.

23 parts of weight of novolac resin, 50 parts by weight of the formed gels, 21.5 parts of methylethyl ketone (MEK), 0.15 parts by weight of BDMA (catalyst); 20 parts by weight of Epoxy 704 (epoxy resin, hardener, NAN YA PLASTICS CORPORATION), 10 parts by weight of Epoxy 901 and 20 parts by weight of Epoxy 828 were for 30 minutes. After the hybrid resin was hardened, it is poured into a plate mold. The mold was then evacuated in vacuum and placed in an oven of 60° C. to obtain specimens. The $T_g$ and stress-strain of these specimens were tested. The $SiO_2$ content is 3–10%, the $T_g$ of the formed hybrid resin is 145–155° C.

Comparative Example 1

1 N HCl solution was first prepared. 4 parts by weight of TEOS, 0.5 parts by weight of ethanol, 0.25 parts by weight of water and 0.25 parts by weight of 1 N HCl were mixed and agitated at a temperature of 60° C. for 1 hour. The mixture became gel 5 days later and silica cluster formed.

Comparative Example 2

1 N HCl solution was first prepared. 4 parts by weight of TEOS, 0.5 parts by weight of ethanol, 0.5 parts by weight of water and 0.25 parts by weight of 1 N HCl were mixed and agitated at a temperature of 60° C. for 1 hour. The mixture became gel 5 days later and silica cluster formed.

Comparative Example 3

1 N HCl solution was first prepared. 4 parts by weight of TEOS, 0.5 parts by weight of ethanol, 1 parts by weight of water and 0.25 parts by weight of 1 N HCl were mixed and agitated at a temperature of 60° C. for 1 hour. The mixture became gel 7 days later and silica cluster formed.

Comparative Example 4

1 N HCl solution was first prepared. 4 parts by weight of TEOS, 0.5 parts by weight of ethanol, 2 parts by weight of water and 0.25 parts by weight of 1 N HCl were mixed and agitated at a temperature of 60° C. for 1 hour. The mixture became gel 9 days later and silica cluster formed.

Comparative Example 5

1 N HCl solution was first prepared. 4 parts by weight of TEOS, 0.5 parts by weight of ethanol, 4 parts by weight of water and 0.25 parts by weight of 1 N HCl were mixed and agitated at a temperature of 60° C. for 1 hour. The mixture did not gel.

Comparative Example 6

1 N HCl solution was first prepared. 4 parts by weight of TEOS, 0.5 parts by weight of ethanol, 0.5 parts by weight of water and 0.25 parts by weight of 1 N HCl were mixed and agitated at a temperature of 60° C. for 1 hour. The mixture became gel 5 days later and silica clusters formed.

Comparative Example 7

1 N HCl solution was first prepared. 4 parts by weight of TEOS, 0.5 parts by weight of ethanol, 0.5 parts by weight of water and 0.5 parts by weight of 1 N HCl were mixed and agitated at a temperature of 60° C. for 1 hour. The mixture became gel 3 days later and silica cluster formed.

Comparative Example 8

1 N HCl solution was first prepared. 4 parts by weight of TEOS, 0.5 parts by weight of ethanol, 0.5 parts by weight of water and 0.75 parts by weight of 1 N HCl were mixed and agitated at a temperature of 60° C. for 1 hour. The mixture became gel 2 days later and silica cluster formed.

Comparative Example 9

1 N HCl solution and 1 N NaF solution were first prepared. 4 parts by weight of TEOS, 0.5 parts by weight of ethanol, 0.5 parts by weight of water, 0.25 parts by weight of 1 N HCl and 0.1 parts by weight of NaF solution were mixed and agitated at a temperature of 60° C. for 1 hour. The mixture became gel 5 hours later and silica cluster formed.

Comparative Example 10

1 N HCl solution and 1 N NaF solution were first prepared. 4 parts by weight of TEOS, 0.5 parts by weight of ethanol, 0.5 parts by weight of water, 0.5 parts by weight of 1 N HCl and 0.1 parts by weight of NaF solution were mixed and agitated at a temperature of 60° C. for 1 hour. The mixture became gel 2 hours later and silica cluster formed.

Comparative Example 11

1 N HCl solution and 1 N NaF solution were first prepared. 4 parts by weight of TEOS, 0.5 parts by weight of ethanol, 0.5 parts by weight of water, 0.75 parts by weight of 1 N HCl and 0.1 parts by weight of NaF solution were mixed and agitated at a temperature of 60° C. for 1 hour. The mixture became gel 1 hour later and silica cluster formed.

Comparative Example 12

1 N HCl solution was first prepared. 4 parts by weight of TEOS, 0.5 parts by weight of water, and 0.5 parts by weight of 1 N HCl were mixed and agitated at a temperature of 60° C. for 1 hour. The mixture became gel 5 days later and silica cluster formed.

Comparative Example 13

1 N HCl solution was first prepared. 4 parts by weight of TEOS, 1 part by weight of D4, 0.5 parts by weight of ethanol, 0.5 parts by weight of water, and 0.5 parts by weight of 1 N HCl were mixed and agitated at a temperature of 6° C. for 1 hour. The mixture became gel 4 hours later and silica cluster formed.

Comparative Example 14

1 N HCl solution was first prepared. 4 parts by weight of TEOS, 2 parts by weight of D4, 0.5 parts by weight of ethanol, 0.5 parts by weight of water, and 0.5 parts by weight of 1 N HCl were mixed and agitated at a temperature of 60° C. for 1 hour. The mixture became gel 3 hours later and silica cluster formed.

Comparative Example 15

1 N HCl solution and 1 N of NaF solution were first prepared. 4 parts by weight of TEOS, 0.5 parts by weight of ethanol, 0.5 parts by weight of water, 0.5 parts by weight of 1 N HCl, and 0.1 parts by weight of NaF solution were mixed and agitated at a temperature of 60° C. for 1 hour. The mixture became gel 2 hours later and silica clusters formed.

Comparative Example 16

1 N HCl solution and 1 N of NaF solution were first prepared. 4 parts by weight of TEOS, 1 part by weight of D4, 0.5 parts by weight of ethanol, 0.5 parts by weight of water, 0.5 parts by weight of 1 N HCl, and 0.1 parts by weight of NaF solution were mixed and agitated at a temperature of 60° C. for 1 hour. The mixture became gel 2 hours later and silica cluster formed.

Comparative Example 17

1 N HCl solution and 1 N of NaF solution were first prepared. 4 parts by weight of TEOS, 2 parts by weight of D4, 0.5 parts by weight of ethanol, 0.5 parts by weight of water, 0.5 parts by weight of 1 N HCl, and 0.1 parts by weight of NaF solution were mixed and agitated at a temperature of 60° C. for 1 hour. The mixture became gel 2 hours later and silica cluster formed.

Comparative Example 18

1 N HCl solution was first prepared. 4 parts by weight of water glass, 1 part by weight of D4, 0.5 parts by weight of ethanol, and 0.5 parts by weight of 1 N HCl were mixed and agitated at a temperature of 60° C. for 1 hour. The mixture became gel 3 hours later and silica cluster formed.

Comparative Example 19

1 N HCl solution was first prepared. 4 parts by weight of water glass, 2 parts by weight of D4, 0.5 parts by weight of ethanol, and 0.5 parts by weight of 1 N HCl were mixed and agitated at a temperature of 60° C. for 1 hour. The mixture became gel 3 hours later and silica cluster formed.

Comparative Example 20

1 N HCl solution was first prepared. 4 parts by weight of water glass, 2 parts by weight of D4, 0.5 parts by weight of ethanol, and 0.75 parts by weight of 1 N HCl were mixed and agitated at a temperature of 60° C. for 1 hour. The mixture became gel 2 hours later and silica cluster formed.

Comparative Example 21

1 N HCl solution was first prepared. 4 parts by weight of water glass, 2 parts by weight of D4, 0.5 parts by weight of ethanol, 2 parts by weight of water, and 0.5 parts by weight of 1 N HCl were mixed and agitated at a temperature of 60° C. for 1 hour. The mixture became gel 3 hours later and silica cluster formed.

Comparative Example 22

1 N HCl solution was first prepared. 4 parts by weight of water glass, 2 parts by weight of D4, 0.5 parts by weight of ethanol, 2 parts by weight of water, and 0.5 parts by weight of 1 N HCl were mixed and agitated at a temperature of 60° C. for 1 hour. The mixture became gel 3 hours later and silica cluster formed.

Comparative Example 23

1 N HCl solution was first prepared. 4 parts by weight of water glass, 2 parts by weight of D4, 0.5 parts by weight of ethanol, 2 parts by weight of water, and 0.75 parts by weight of 1 N HCl were mixed and agitated at a temperature of 60° C. for 1 hour. The mixture became gel 2 hours later and silica cluster formed.

What is claimed is:

1. A process for preparing a silica-based inorganic-organic hybrid resin, comprising the following steps:
    (a) hydrolyzing a silane compound having a formula of $R^1_n Si(OR^2)_{4-n}$ wherein n is an integer of 0, 1, 2 or 3, $R^1$ is a terminal group selected from the group consisting of alkyl, epoxy, alkenyl, amino, carboxyl, and hydroxy, as well as an alkyl having the above-mentioned terminal group, $R^2$ is an $C_1$–$C_4$ alkyl in the presence of phenol or phenolic resin;
    (b) condensing said hydrolyzed silane to obtain a silica cluster;
    (c) reacting said silica cluster with a siloxane to obtain a modified silica cluster; and
    (d) reacting said modified silica cluster with a thermosetting resin having at least one hydroxy group in its structure to obtain the silica-based inorganic-organic hybrid resin.

2. The process as claimed in claim 1, wherein said silane is tetraethoxysilane and said siloxane is cyclosiloxane having a formula of $(R_2^3 SiO)_m$ wherein $R^3$ is an alkyl and m is an integer equal or greater than 3.

3. The process as claimed in claim 2, wherein said cyclosiloxane is octamethyl cyclotetrasiloxane.

4. The process as claimed in claim 1, wherein said phenolic resin is novolac resin.

5. The process as claimed in claim 4, wherein said novolac resin has a molecular weight smaller than 30,000.

6. The process as claimed in claim 5, wherein the molecular weight of said novolac resin is smaller than 5000.

7. The process as claimed in claim 1, wherein step (a) is performed in a liquid organic solvent.

8. The process as claimed in claim 7, wherein said organic solvent is a polar organic solvent.

9. The process as claimed in claim 8, wherein said polar organic solvent is selected from the group consisting of ester, ketone, ether, alcohol, aliphatic solvent, and aromatic solvent.

10. The process as claimed in claim 9, wherein said polar organic solvent is methanol.

11. The process as claimed in claim 1, wherein said thermosetting resin is novolac resin.

12. A silica-based inorganic-organic hybrid resin, prepared from at least the following ingredients:
  (a) a silane compound having a formula of $R^1{}_n Si(OR^2)_{4-n}$ wherein n is an integer of 0, 1, 2 or 3, $R^1$ is a terminal group selected from the group consisting of alkyl, epoxy, alkenyl, amino, carboxyl, and hydroxy, as well as an alkyl having the above-mentioned terminal group, $R^2$ is an $C_1$–$C_4$ alkyl;
  (b) a cyclosiloxane having a formula of $(R_2{}^3 SiO)_m$ wherein $R^3$ is an alkyl and m is an integer equal or greater than 3;
  (c) a thermosetting resin; and
  (d) an organic solvent.

13. The inorganic-organic hybrid resin as claimed in claim 11, wherein the weight ratio of ingredients (a):(b):(c):(d) is 100:0–200:10–200:10–200.

14. The inorganic-organic hybrid resin as claimed in claim 12, wherein the weight ratio of ingredients (a):(b):(c):(d) is 100:10–60:20–60:10–60.

15. A process for preparing a silica-based inorganic-organic hybrid resin, comprising the following steps:
  (a) hydrolyzing a silane compound having a formula of $R^1{}_n Si(OR^2)_{4-n}$ wherein n is an integer of 0, 1, 2 or 3, $R^1$ is a terminal group selected from the group consisting of alkyl, epoxy, alkenyl, amino, carboxyl, and hydroxy, as well as an alkyl having the above-mentioned terminal group, $R^2$ is an $C_1$–$C_4$ alkyl in the presence of phenol or phenolic resin;
  (b) condensing said hydrolyzed silane to obtain a silica cluster; and
  (c) reacting said silica cluster with a thermosetting resin having at least one hydroxy group in its structure to obtain the silica-based inorganic-organic hybrid resin.

16. The process as claimed in claim 15, wherein said silane is tetraethoxysilane.

17. The process as claimed in claim 15, wherein said phenolic resin is phenolic-novolac resin.

18. The process as claimed in claim 15, wherein said phenol or phenolic resin has a molecular weight smaller than 30,000.

19. The process as claimed in claim 15, wherein the molecular weight of said phenol or phenolic resin is smaller than 5000.

20. The process as claimed in claim 15, wherein step (a) is performed in a liquid organic solvent.

21. The process as claimed in claim 19, wherein said organic solvent is a polar organic solvent.

22. The process as claimed in claim 20, wherein said polar organic solvent is selected from the group consisting of ester, ketone, ether, alcohol, aliphatic solvent, and aromatic solvent.

23. The process as claimed in claim 20, wherein said polar organic solvent is methanol.

24. The process as claimed in claim 15, wherein said thermosetting resin is novolac resin.

* * * * *